United States Patent
Atanackovic et al.

(10) Patent No.: US 9,101,876 B2
(45) Date of Patent: Aug. 11, 2015

(54) CARBON CAPTURE

(75) Inventors: Petar Branko Atanackovic, Henley Beach (AU); John Charles Ellice-Flint, Henley Beach (AU)

(73) Assignee: Applied Hybrid Energy Pty Ltd., Henley Beach, South Australia (AU)

(*) Notice: Subject to any disclaimer, the term of this patent is extended or adjusted under 35 U.S.C. 154(b) by 634 days.

(21) Appl. No.: 13/202,183

(22) PCT Filed: Feb. 25, 2010

(86) PCT No.: PCT/AU2010/000217
§ 371 (c)(1),
(2), (4) Date: Mar. 26, 2012

(87) PCT Pub. No.: WO2010/096871
PCT Pub. Date: Sep. 2, 2010

(65) Prior Publication Data
US 2012/0174482 A1    Jul. 12, 2012

(30) Foreign Application Priority Data

Feb. 25, 2009    (AU) .............................. 2009900813

(51) Int. Cl.
*B01D 53/02*    (2006.01)
*B01D 53/62*    (2006.01)
*B01D 53/86*    (2006.01)
*B01D 71/02*    (2006.01)

(52) U.S. Cl.
CPC ............... *B01D 53/62* (2013.01); *B01D 53/02* (2013.01); *B01D 53/864* (2013.01); *B01D 71/022* (2013.01); *B01D 2253/112* (2013.01); *B01D 2255/206* (2013.01); *B01D 2257/502* (2013.01); *B01D 2257/504* (2013.01); *Y02C 10/04* (2013.01); *Y02C 10/08* (2013.01); *Y02E 20/16* (2013.01)

(58) Field of Classification Search
None
See application file for complete search history.

(56) References Cited

U.S. PATENT DOCUMENTS

| | | | |
|---|---|---|---|
| 4,937,059 A * | 6/1990 | Kolts et al. ................ | 423/230 |
| 5,045,289 A | 9/1991 | Fernando et al. | |
| 5,531,808 A * | 7/1996 | Ojo et al. ........................ | 95/96 |
| 5,690,889 A | 11/1997 | McCallum et al. | |
| 6,391,090 B1 * | 5/2002 | Alvarez et al. ................ | 95/116 |
| 7,919,064 B2 * | 4/2011 | Kawatra et al. ............... | 423/232 |
| 2001/0001782 A1 * | 5/2001 | Ohashi et al. ................ | 502/400 |
| 2005/0059546 A1 * | 3/2005 | Suzuki et al. ................ | 502/302 |
| 2006/0117952 A1 * | 6/2006 | Bancon et al. ................ | 95/96 |
| 2009/0101008 A1 | 4/2009 | Lackner et al. | |
| 2011/0162525 A1 * | 7/2011 | Harle et al. ................... | 95/139 |

FOREIGN PATENT DOCUMENTS

| | | |
|---|---|---|
| WO | 2005/009593 A1 | 2/2005 |
| WO | 2009/44143 A1 | 12/2009 |
| WO | 2009/144143 A1 | 12/2009 |

OTHER PUBLICATIONS

International Search Report for PCT/AU2010/000217, ISA/AU, Woden, ACT, mailed Apr. 15, 2010.

* cited by examiner

*Primary Examiner* — Duane Smith
*Assistant Examiner* — Phillip Shao
(74) *Attorney, Agent, or Firm* — Harness, Dickey & Pierce, P.L.C.

(57) ABSTRACT

The present invention relates to the separation and capture of carbon-containing compounds from gases. Specifically, the present invention relates to the use of rare-earth based compounds for the capture and separation of carbon-containing compounds from gases. The carbon capture processes can be integrated into fossil fuel power generation plants or other industrial process plants in order to reduce emission of greenhouse gases from the plants.

13 Claims, 15 Drawing Sheets

400 RE$_2$ C$_3$

CARBON CAPTURE

REFERENCE TO RELATED APPLICATIONS

This application is a 371 U.S. National Stage of International Application No. PCT/AU2010/000217, filed 25 Feb., 2010, which claims priority to Australian provisional patent application No. 2009900813, filed 25 Feb. 2009, the content of which is hereby incorporated by reference.

FIELD

The present invention relates to the separation and capture of carbon-containing compounds from gases. Specifically, the present invention relates to the use of rare-earth based compounds for the capture and separation of carbon-containing compounds from gases. The carbon capture processes can be integrated into fossil fuel power generation plants or other industrial process plants in order to reduce emission of greenhouse gases from the plants.

BACKGROUND

The large scale burning of fossil fuels for electricity generation and other industrial processes, such as natural gas processing, ammonia production, cement manufacture, etc., results in the release of greenhouse gases, such as carbon dioxide, into the atmosphere. Electricity generation and industrial processes are the main sources of carbon dioxide emissions in most industrialised nations, and by far the largest single source of carbon dioxide emissions is fossil fuel based electricity generation, whether that be from coal, oil or natural gas.

In recent times, considerable attention and political pressure has been applied on organisations and individuals to reduce the amount of carbon dioxide that is released into the atmosphere. One way this can be done is to capture the emitted carbon dioxide before it is released into the atmosphere. The aim of so called "carbon capture" processes is to capture, separate and purify the emitted carbon dioxide so that it can subsequently be sent off to storage, in which case it is effectively taken out of the atmosphere.

Technologies for capturing carbon dioxide from electricity generation include post-combustion capture, pre-combustion capture, and oxy-firing.

In post-combustion capture, carbon dioxide is separated from the flue gas after fuel (coal or natural gas) is burnt. The main post-combustion products from sweetened natural gas (NG) or liquefied natural gas (LNG) fired power plants are nitrogen oxide gases and carbon oxide gases. Waste product output streams from NG plants have relatively low carbon dioxide content (3-5%), but in some cases this is increased by burning the NG in oxygen rather than air. Regardless, the output stream is at atmospheric and/or low pressure and comprises $[CO_2]_{Air}>\sim3\text{-}5\%$ carbon dioxide if the fuel was burnt in air and $[CO_2]_{Oxy}>70\%$ if the fuel was burnt in oxygen.

Prior art techniques for capturing carbon dioxide utilize a chemical capture process in which the carbon dioxide in the waste stream is captured with an amine based solvent absorber. However, the amine based solvents that are typically used, such as methyl-ethanolamine (MEA) and methyl-diethanolamine (MDEA), are toxic, they decompose over time, and the efficiency of capture of carbon dioxide at low partial pressures is poor. Large columns are utilized for these prior art solvent carbon capture processes wherein the solvent is dispersed in a shower head configuration. Such configurations are limited in surface area contact of solvent with incoming waste product flue gas. Furthermore, post-combustion carbon dioxide capture processes based on absorption of carbon dioxide by a solvent have high energy requirements which result in an efficiency penalty on the power cycle. For MEA solvent based processes, cooling of the flue gas is necessary for absorption. Heat energy is then necessary to regenerate the solvent and also the steam that is used for stripping the carbon dioxide.

There is a need for alternative carbon capture processes that can be used to capture carbon dioxide and other carbon gases, such as carbon monoxide, from the output stream of power plants, such as natural gas fired gas turbine power plants.

Reference to any prior art in this specification is not, and should not be taken as, an acknowledgment or any form of suggestion that this prior art forms part of the common general knowledge in any country.

SUMMARY

The present invention results from research into the use of rare-earth based materials suitable for adsorption and/or absorption of carbon-containing compounds.

In a first aspect, the present invention provides a process for capturing a carbon-containing compound from a gas, the process comprising contacting the gas with a rare-earth metal and/or rare-earth metal compound for a time and under conditions suitable to remove at least some of the carbon-containing compound from the gas to produce a treated gas, and then separating the treated gas from the rare-earth metal and/or rare-earth metal compound.

The gas contemplated in the present invention may be any gas containing a carbon-containing compound which is removable by contact with a rare-earth metal and/or rare-earth metal compound. Examples of such gases include combustion gases (including carbon-containing fossil fuels) and industrial waste gases such as those resulting from natural gas processing, ammonia processing, cement manufacture and the like.

In some embodiments, the gas may be a combustion gas. The term "combustion gas" may include a fuel, such as natural gas or other carbon-containing fossil fuel. In these embodiments, the process may be used to remove a carbon-containing compound in a pre-combustion carbon capture process. Alternatively, the combustion gas may be a waste from a combustion process. In these embodiments, the process may be used to remove a carbon-containing compound in a post-combustion carbon capture process.

In light of the above, a person skilled in the art would appreciate that the processes of the present invention can be applied to a large spectrum of pre-combustion and post-combustion power generation methods using coal, natural gas, oil, coal-seam gas, syngas, and other carbon based fossil fuels.

In most cases, the carbon-containing compound will be carbon dioxide, carbon monoxide, or a mixture of these. As used herein, carbon dioxide and carbon monoxide are collectively referred to as 'carbon oxide gases' and the term carbon oxide gas refers to either carbon monoxide, carbon dioxide, or both.

The rare-earth metal and/or rare-earth metal compound may be a rare-earth metal, a rare-earth oxide, a rare-earth chloride, a hydrated rare-earth metal compound, or a rare-earth hydroxyl ($REO_x \cdot (H_2O)_y$) compound.

The rare-earth metal and/or rare-earth metal compound may adsorb and/or absorb carbon oxide gases to form rare-earth-carbides (RECs), rare-earth oxycarbides (REOCs), and/or rare-earth-nitrogen carbides (RENCs). As discussed in more detail later, the compounds formed from adsorption or absorption of carbon containing gases may be utilised in electrochemical fuel cells for production of electrical energy and/or for the further extraction of carbon based greenhouse gases.

By way of example, the process of the present invention may be used in a natural gas burning combined cycle gas turbine and steam turbine power plant. Near to stoichiometric combustion with oxygen optionally enables higher $CO_2$% in the output stream. The output stream enters the rare-earth based separation process and is supplied with sufficient thermal energy via optional solar thermal energy and/or recovered heat from the turbine coolant cycle.

It is possible to utilise a two step process wherein selective capture of the carbon from the incoming carbon dioxide and carbon monoxide containing stream is via use of rare-earth based compounds. The subsequent rare-earth-carbide containing compound is then thermally treated and/or chemically treated to liberate the captured carbon suitable for storage.

In a second aspect, the present invention also provides an apparatus for capturing a carbon-containing compound from a gas, the apparatus including a housing having an inlet for the gas and an outlet for a treated gas, the housing including a rare-earth metal and/or rare-earth metal compound arranged so that, in use, the gas contacts the rare-earth metal and/or rare-earth metal compound to remove at least some of the carbon-containing compound from the gas to produce a treated gas, and the treated gas is separated from the rare-earth metal and/or rare-earth metal compound.

The present invention is generally, but not limited to, the fields of carbon capture and energy conversion materials and generation. In particular, the present invention makes use of: (i) rare-earth oxide; (ii) rare-earth-carbide; (iii) rare-earth carbon-oxide; (iv) rare-earth carbon-oxynitride; (v) rare-earth carbon-oxyphosphide; (vi) rare-earth hydride; (vii) rare-earth chloride; and/or (viii) combinations thereof, in the capture of carbon. Hydrogenated forms of these compounds may also be used.

DESCRIPTION OF EXEMPLARY EMBODIMENTS

The present invention will now be described in relation to various embodiments, of which some aspects are illustrated in the accompanying figures. It is to be understood that the following description is for the purpose of describing particular embodiments only and is not intended to be limiting with respect to the above description.

In the figures:

FIG. 1 is a simplified block diagram of a process according to an embodiment of the present invention. FIG. 1A shows a pre-combustion process in accordance with embodiments of the invention. FIG. 1B shows a post-combustion process in accordance with embodiments of the invention.

Figure 1:
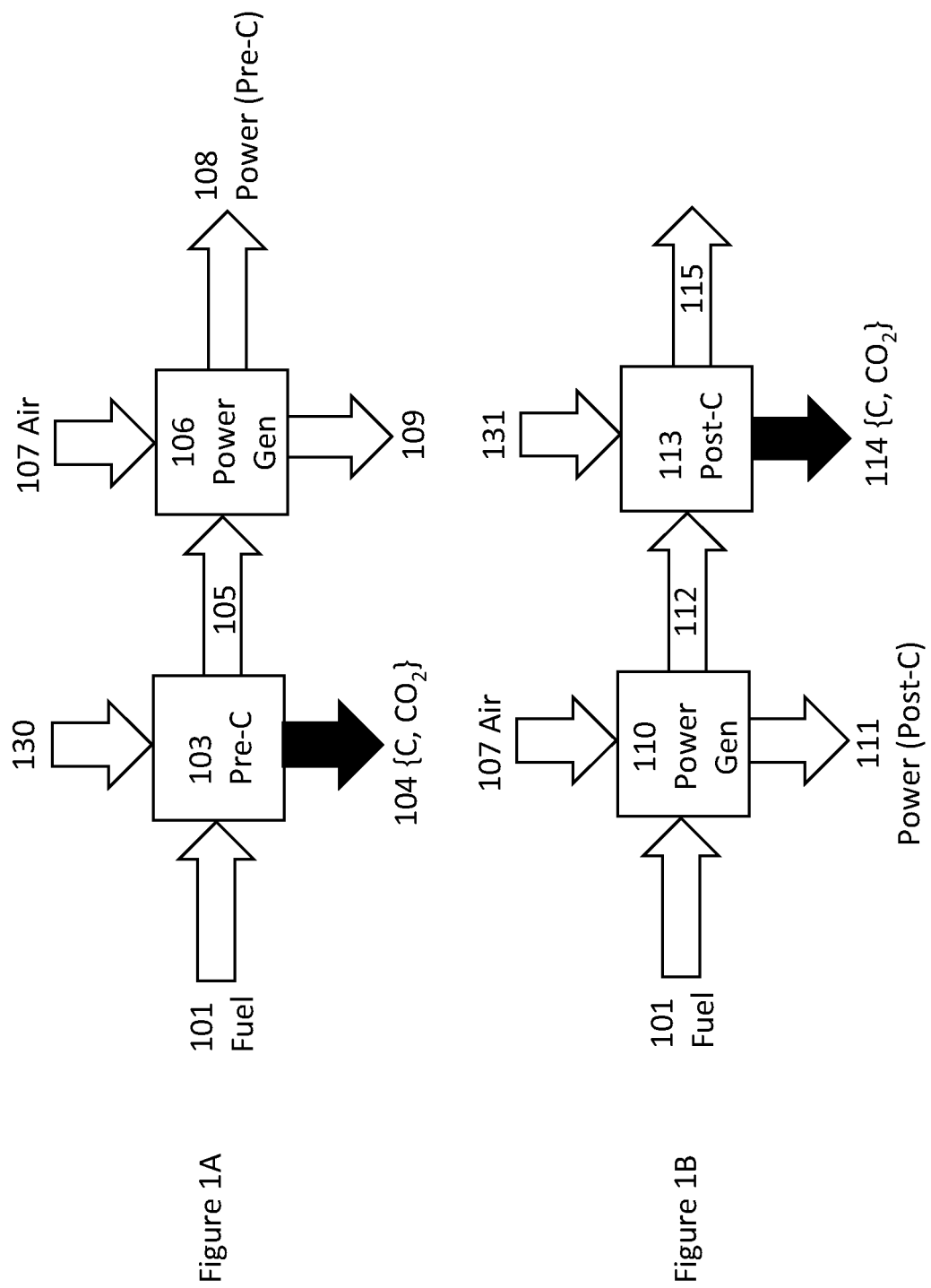

The present invention provides a process for capturing a carbon-containing compound 104,114 from a combustion gas 101,112. The process includes contacting the combustion gas 101,112 with a rare-earth metal and/or rare-earth metal compound 103,113 for a time and at a temperature sufficient to remove at least some of the carbon-containing compound 104,114 from the combustion gas. The combustion gas is then separated from the rare-earth metal and/or rare-earth metal compound. The process may be a pre-combustion carbon capture process (FIG. 1A) or a post-combustion carbon capture process (FIG. 1B).

From the foregoing description it will be evident that the term "combustion gas", and similar terms, means either a gas that is able to undergo combustion (such as a fuel), or a gas that is a product of combustion (such as a waste gas stream from a combustion process).

As set out previously, in some embodiments, the method may also be applied to the capture of carbon-containing compounds from gases not involved in, or produced by, combustion but for which the removal of a carbon-containing compound is desirable. Examples of such gases include. Examples of such gases include industrial waste gases such as those resulting from natural gas processing, ammonia processing, cement manufacture and the like.

In the pre-combustion process (FIG. 1A), the combustion gas is a hydrocarbon fuel 101 which is contacted with the rare-earth metal and/or rare-earth metal compound 103 for a time and at a temperature sufficient to remove at least some of the carbon-containing compound 104 from the combustion gas. This produces a carbon-compound containing stream 104 which has a high concentration of carbon dioxide (preferably in excess of 90% $CO_2$), and a hydrogen rich reactant

105 (for example, $H_2$) which is suitable for substantially carbon-free combustion and/or fuel cell consumption in power generation process 106. Process 106 consumes substantially carbon-free reactant 105 and air or oxygen 107 and produces power 108 and substantially carbon-free by-products 109. Rare-earth carbide based compounds may be used advantageously to reduce hydrocarbon feedstock to produce substantially carbon-free reactant 105, such as hydrogen gas.

In the post-combustion process (FIG. 1B), hydrocarbon fuel 101 produces utility power 111 via direct combustion 110 with air or oxygen 107. The combustion gas in this case is the post-combustion products 112 of process 110. The post-combustion products 112 include oxygen nitrides, oxides of carbon and other substances specific to the hydrocarbon 101 type consumed. The combustion gas 112 is contacted with the rare-earth metal and/or rare-earth metal compound 113 to separate the oxides of carbon into substantially pure carbon dioxide product 114 and carbon-free products 115.

Both pre- and post-combustion processes require the input of energy 130 and 131 in process modules 103 & 113, respectively. The energy required for processes 103 and 113 can be either diverted from the utility power output of the generation modules and/or provided by renewable energy sources. Typically, if energy for the carbon separation and/or capture process is derived from the final output utility power generated, then the system efficiency as a whole is reduced compared to the case where no carbon capture and/or separation is used.

The present invention will now be described in relation to use of the processes in fossil fuel based power plants. However, from the description provided herein it will be evident to the skilled person that the processes of the present invention can also be used in the capture of carbon containing gases from other industrial processes and, therefore, that the present invention is not limited in its application to power plants.

Figure 2:
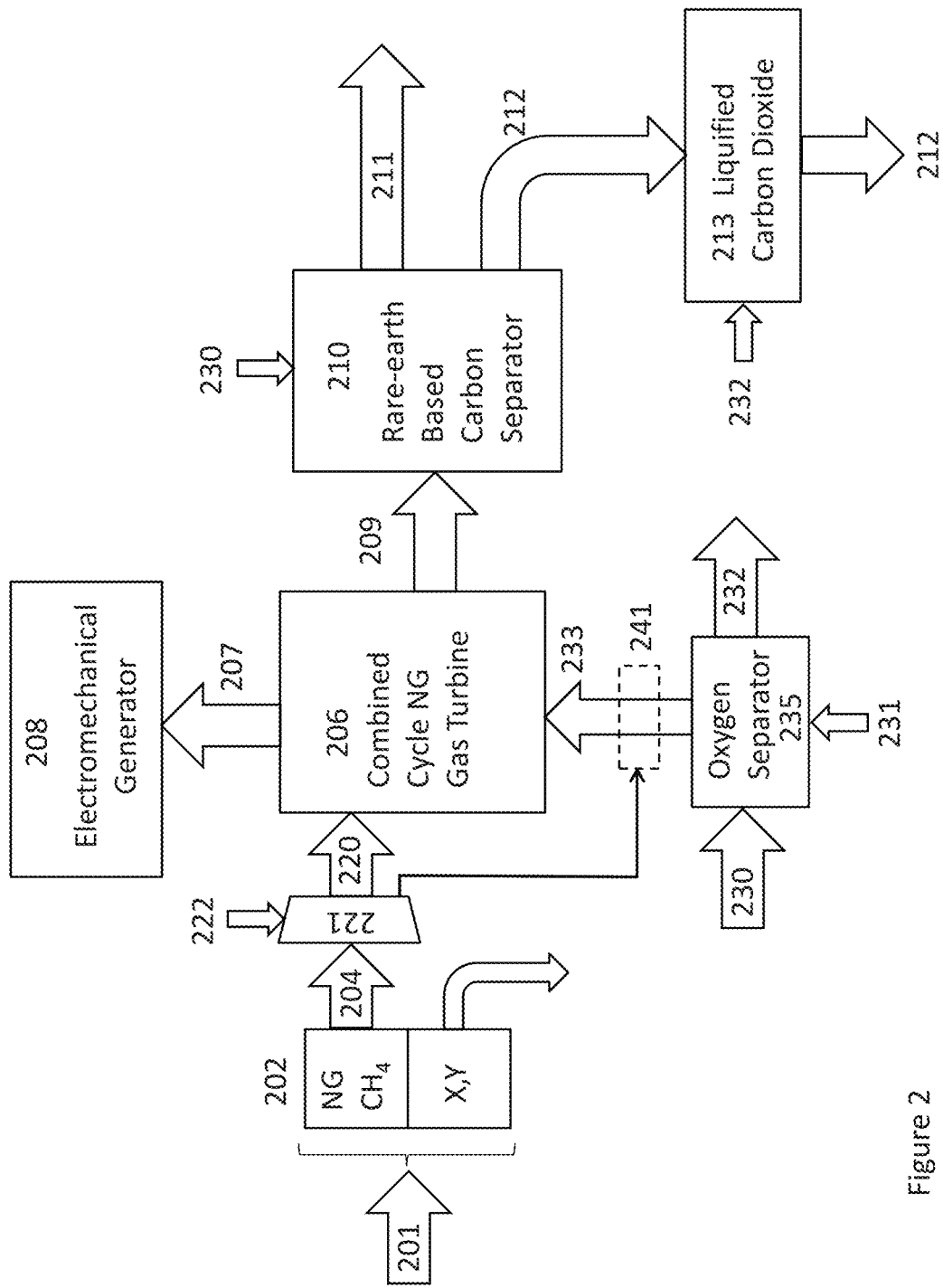
FIG. 2 is a simplified block diagram of a NG fired combined cycle gas (CCG) turbine power plant incorporating a carbon capture process in accordance with embodiments of the invention.

FIG. 2 shows a block diagram describing the operation of a Natural Gas (NG)-fired combined cycle gas (CCG) turbine power plant incorporating a process of the present invention to remove carbon containing compounds from the waste gas stream in a post-combustion process.

NG is advantageously used for electrical power generation due to the relatively high efficiency of NG fuelled plants which can offer up to 55-65% conversion efficiency, without loss due to carbon capture. NG can be characterised in raw composition by general geographic location based on local geology. NG is commercially produced from natural gas fields, oil fields, coal beds or marine and terrestrial hydrates ($[CH_4] \cdot [nH_2O]$, where $n \geq 1$). The natural gas industry is producing gas from increasingly more challenging resource types: sour gas, tight gas, shale gas and coal-bed methane/coal seam gas and ocean floor hydrates.

Furthermore, terrestrial and marine derived NG fields/deposits differ in the amount of methane, heavy hydrocarbons, water and carbon dioxide in the extracted product. Terrestrial NG deposits generally produce comparably low carbon dioxide and majority methane, whereas marine sourced NG additionally comprise problematic sulphides (e.g., acid gas $H_2S$) and higher levels of carbon dioxide. An example of terrestrial sourced NG comprises at least 80 volume % $CH_4$, 10% $C_2H_6$, 7% $C_3H_8$ and 3% $C_4H_{10}$. Coal seam gas (CSG) derived from terrestrial sources also has the advantage of comprising almost all hydrocarbon gas (viz: $CH_4$) with little or no carbon dioxide. Syngas derived from coal is also a potential source of fuel for combustion based power generation, however, the energy and cost penalty in forming the gas product is an issue.

Separation of carbon dioxide from exhaust gas is possible using alkanolamines (e.g., MEA and/or MDEA) but this process is limited by the surface area of the reaction process. In contrast, the rare-earth metal or rare-earth metal compounds used in the processes of the present invention are in a solid state, such as a powder, layered sheets or cylinders, a combination membrane, or other high porosity configurations, and therefore provide a greater surface area. The increase in surface area of the rare-earth metal or rare-earth metal compounds enables a compact post-combustion capture method.

An NG fuelled plant may be physically located in close proximity to a natural gas extraction field. NG extracted from the gas field collection system 201 is processed 202 to sweeten the feedstock gas 204 to high percentage methane. Methods for sweetening NG are known in the art and any of those methods may be used. Optionally, the NG 204 can be liquefied into LNG by mechanical compression 221 and the LNG then used for combustion feedstock 220. The compressor energy can be supplied by a gas turbine or a large power photovoltaic array. Optionally, the LNG production process can be used to cool the intake air and/or oxygen 241 in order to increase feedstock gas density so as to improve the efficiency of the CCG turbine and increase the carbon dioxide partial pressure in the combustion gas 209. Optionally, high partial pressure and/or percentage oxygen 233 can be extracted from air 230 and used for improving the stoichiometry of the NG and/or LNG combustion. The methane 204 is combusted in the CCG power plant 206 converting the energy of combustion 207 into rotational mechanical energy suitable for driving the shaft of an electromechanical generator set 208. A secondary steam turbine is used to increase the efficiency of the plant and a portion of the combustion energy 207 is diverted to generating steam (not shown). The waste gases 209 typically comprise high pressure or atmospheric pressure flue gas. In some embodiments, high pressure turbine waste gas is utilized for feeding the carbon capture process.

The carbon containing waste gas 209 comprises 3-5% carbon dioxide and is then transported to the carbon capture and/or separator module 210. Typically, prior art MEA and MDEA carbon capture processes require substantial cooling of the flue gas 209 for optimal carbon capture. An advantage of the processes of the present invention is that they tolerate relatively high temperature flue gases. Thus, the high temperature flue gas 209 may be directly input into the rare-earth based carbon separation module 210. The carbon-containing compounds in the waste flue gas are captured by the rare-earth metal or rare-earth compounds and separated from the carbon-reduced or carbon-free exhaust gas 211. The captured carbon containing species 212 is then removed from the system. In some embodiments, the captured carbon is liberated in the form of carbon dioxide which can then be cooled into a liquid suitable for transport and geological sequestration using processes known in the art. In some embodiments, the captured liquefied carbon dioxide is transported back to the NG gas field and sequestered therein 270. By advantageously sequestering the carbon dioxide back into a NG field, an increased pressure in the gas field can then be used to improve the NG extraction process.

Energy 250, 251, 252 & 253 is supplied for processes 221, 235, 210 & 213, respectively. The energy is either diverted from the utility power generated and/or provided by renewable energy sources.

Rare-earth metal and/or rare-earth metal compounds possess a wide range of chemical, electronic and structural properties. The rare-earth (RE) atomic species, also known commonly as the lanthanide series of the periodic table of elements, viz., $^{57}La$, $^{58}Ce$, $^{59}Pr$, $^{60}Nd$, $^{61}Pm$, $^{62}Sm$, $^{63}Eu$, $^{64}Gd$, $^{65}Tb$, $^{66}Dy$, $^{67}Ho$, $^{68}Er$, $^{69}Tm$, $^{70}Yb$, $^{71}Lu$, provide a rich and wide range of unique chemical, electronic, optical, thermoelectric, thermal and catalytic properties.

Figure 2A:
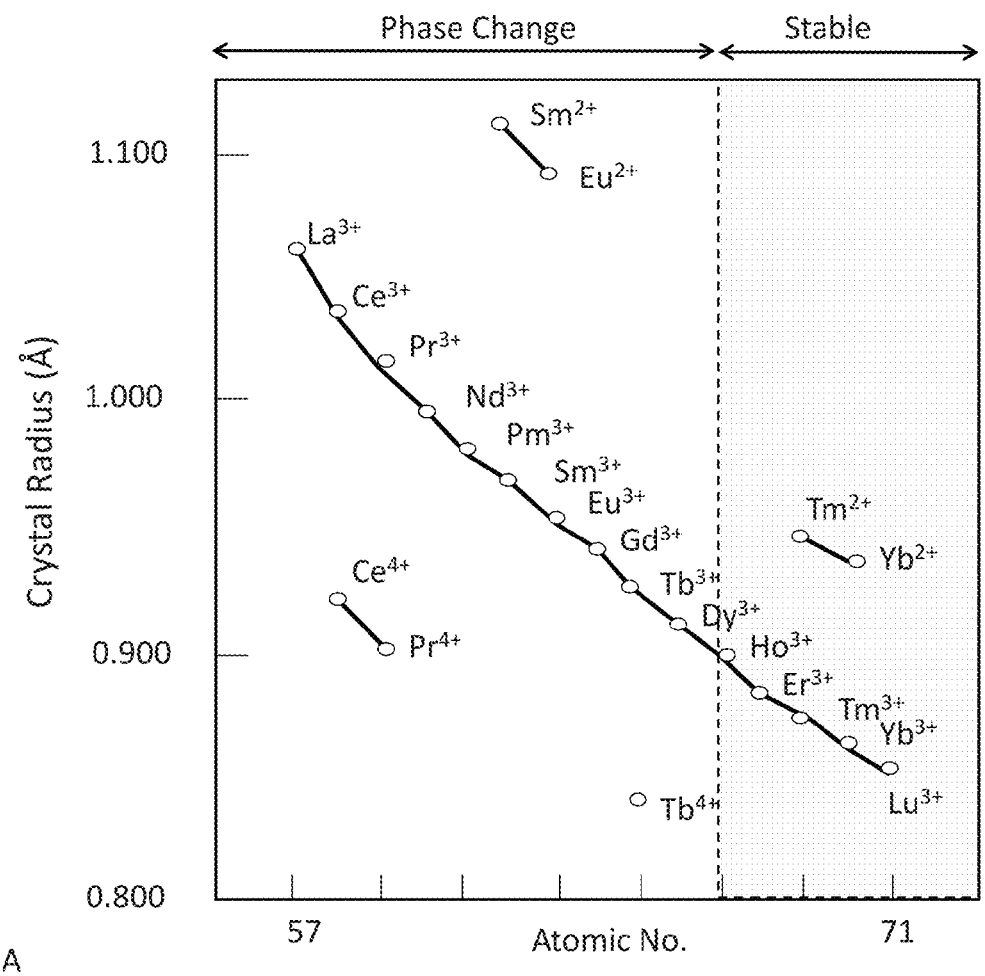
FIG. 2A is a plot of the crystal radius of various rare-earth metals as a function of specific rare-earth atomic number for various ionizations states.

Rare-earth atoms, when incorporated into solid state compounds, exhibit advantageous bonding schema. The materials disclosed herein are based on rare-earth (RE) metal atoms incorporated into compounds containing at least one of carbon, oxygen, nitrogen, phosphorus, chlorine or hydrogen. Other species are possible. Typically the cost of extraction of rare-earth metals is increased substantially by separating specific rare earth species from other rare-earths. However, the chemical activity for the purpose of carbon oxide affinity is generally similar for all rare-earth metals, depending upon specific ionization states available. Therefore, mixed rare-earth compounds can be used advantageously for the purpose of carbon capture. FIG. 2A plots the crystal radius as a function of specific rare-earth atomic number for various ionizations states. Depending upon the ionization state of a given rare-earth metal it is capable of forming various rare-earth carbide compounds.

In a simplest form, binary rare-earth carbides can be classified according to the carbon-to-metal ratio in the formula $REC_x$, where x>0 denotes the carbon fraction. Rare-earth metals have a very high affinity for carbon and can reduce carbon monoxide and/or dioxide.

The binary $REC_x$ crystal structure can be ideally classified as corresponding to the length of the carbon-carbon (C—C) bond. Short C—C dimer bond lengths result in structures of the form $REC_2$, and longer C—C bond lengths result in $RE_2C_3$ crystal structures.

The present invention teaches the advantageous selection of rare-earth structure type for optimal selection of predetermined crystal structure and carbon capture affinity.

FIG. 2A shows the choice of rare-earth species can be used to determine the available bonding states with carbon. For example, $RE^{2+}$ bonding states are ideal for $REC_2$, $RE^{4+}$ are ideal for rare-earth monocarbide $RE_1C_1$ and $RE_3C_4$, and $RE^{3+}$ for $RE_2C_3$. RE-ions which form multiple ionization states are likely to form mixed structures and/or phase compounds upon synthesis. These multi-component structures can be optimized to form a structure type depending on the production conditions of the rare-earth carbide material.

Figure 3:
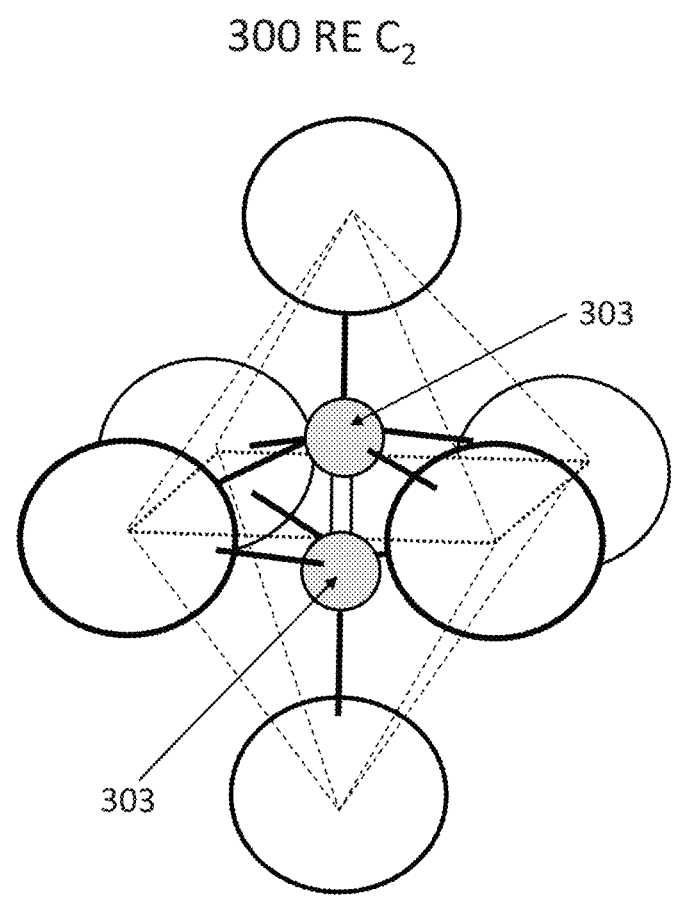
FIG. 3 shows the unit cell of the rare-earth compound dicarbide $REC_2$.

Structures containing short inter C—C bond distances crystallize in cubic rare-earth dicarbides $REC_2$, where x=2 for a stoichiometric composition, and form a body-centered tetragonal system. The unit cell is shown in FIG. 3. The $C_2$ dimers 303 typically arrange along the c-axis of the distorted lattice and are sixfold coordinated by RE cations.

The rare-earth elements $Sm^{2+}$, $Eu^{2+}$, $Tm^{2+}$ and $Yb^{2+}$ enable preferential production of a rare-earth dicarbide structure, $REC_2$. The heavier RE dicarbides, namely $TmC_2$ and $YbC_2$ possess higher temperature stability of crystal structure and are advantageous for high temperature operation.

Non-stoichiometric structures are also included in the present group classification such that carbon-rich x>2.0 and carbon-vacancy x<2.0 formation is also possible. For example, such structures may be defined by the formula $REC_{2\pm y}$, where 0≤y<0.5.

The rare-earth metal or rare-earth metal compound may be porous, amorphous, polycrystalline or a single crystal structure. Large pore solid state compositions are advantageous in the present invention for large surface area function as carbon capture membrane.

Figure 4:
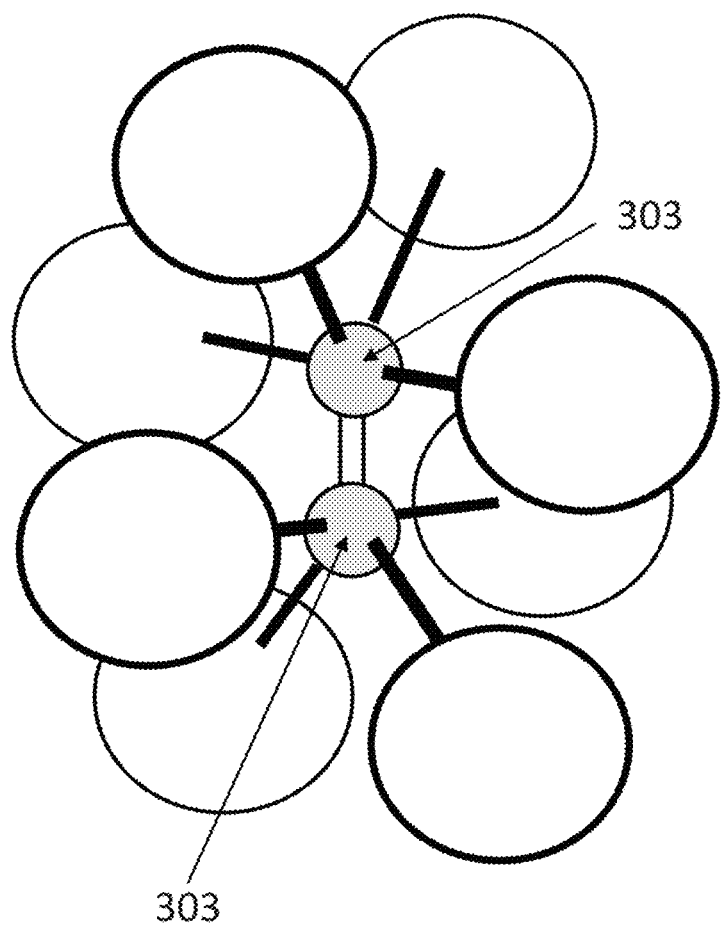
FIG. 4 shows the unit cell of the rare-earth sesquicarbide $RE_2C_3$.

Rare earth carbides may also be composed of the $Pu_2C_3$-type cubic crystal structure of $RE_2C_3$, as shown in FIG. 4. Non-stoichiometric structures are also included in the present group classification such that carbon-rich x>1.5 and carbon-vacancy x<1.5 formation is also possible. For example, such structures may be defined by the formula $REC_{1.5\pm y}$, where 0≤y<0.5.

$La^{3+}$, $Nd^{3+}$, $Pm^{3+}$, $Gd^{3+}$, $Dy^{3+}$, $Ho^{3+}$, $Er^{3+}$, $Lu^{3+}$ may be suitable for growth of rare-earth sesquicarbide structures, $RE_2C_3$.

The structural degrees of freedom of the $Pu_2C_3$-type phase play a key role in controlling the electronic and chemical structure.

FIGS. 3 and 4 show schematically the unit cell crystal structures of rare-earth dicarbide $REC_2$ 300 and rare-earth sesquicarbide $RE_2C_3$ 400, respectively.

The rare-earth monocarbide REC crystal structure is also of interest in the present invention. Rare-earth monocarbide with $RE^{4+}$ cations can form bonds with $C^{4-}$ in a high symmetry $RE^{4+}C^{4-}$ compound with rock-salt NaCl crystal structure. The $RE^{4+}$ cations may be chosen from Ce, Pr, and Tb, to form CeC, PrC and TbC.

The transport of carbon through a rare-earth carbide compound may be via carbon vacancy, carbon interstitial or other defective structures allowing the passage of carbon atoms selectively through the material. Such a preferential mechanism of physically propagating carbon atoms may thus be used for separation of carbon or carbon-based material either in gaseous, liquid or solid phases from a mixture containing non-carbon materials.

The rare-earth metal containing compound may also be a ternary compound of the form $REC_xM_y$, where atom M is chosen from one of oxygen, nitrogen, phosphorus, chlorine or hydrogen. For example, the addition of O into $REC_x$ in order to form $REC_x(O)_y$ can be used advantageously to alter the affinity of carbon and/or carbon oxide. For example, the crystal phase and/or structure of $REC_x$ can be modified via the C/O ratio. Conversely, the crystal phase and/or structure of rare-earth oxide $REO_x$ can be modified via the C/O ratio.

Figure 5:
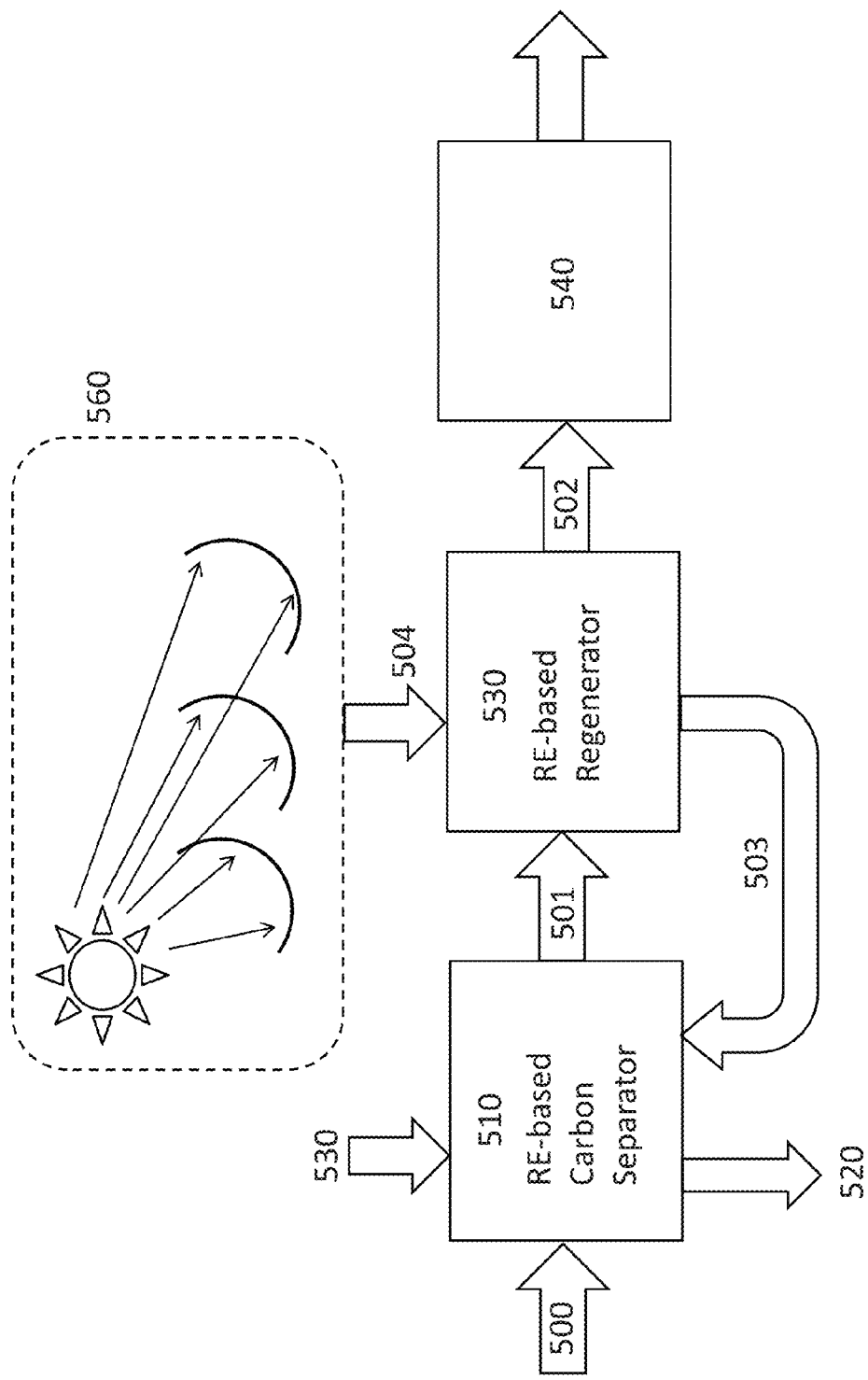
FIG. 5 is a simplified block diagram of a process according to an embodiment of the present invention.

Carbon capture via removal of carbon oxide in post combustion flue gas is possible using a rare-earth based capture process shown in FIG. 5. Carbon oxide containing waste gas 500 generated from the power generation process of FIG. 2 is input into rare-earth based carbon separator process 510. Energy 530 is supplied to drive the process 510 wherein substantially carbon-free component separated from input flue gas 500 is expelled from the system 520. The captured carbon oxides, for example in the form of separated rare-earth carbides and/or rare-earth oxy-carbides 501 are transported to a rare-earth regenerator process 530. The regeneration process consumes energy 504 for regenerating the rare-earth based active component and is supplied back 503 to the separator module 510. For example, the energy 504 supplied to the regenerator module can be provided by a solar thermal collection process 560. The by-product 502 from the regeneration process 530 may be various gases such as hydrogen and/or rare-earth based compounds.

Figure 6:
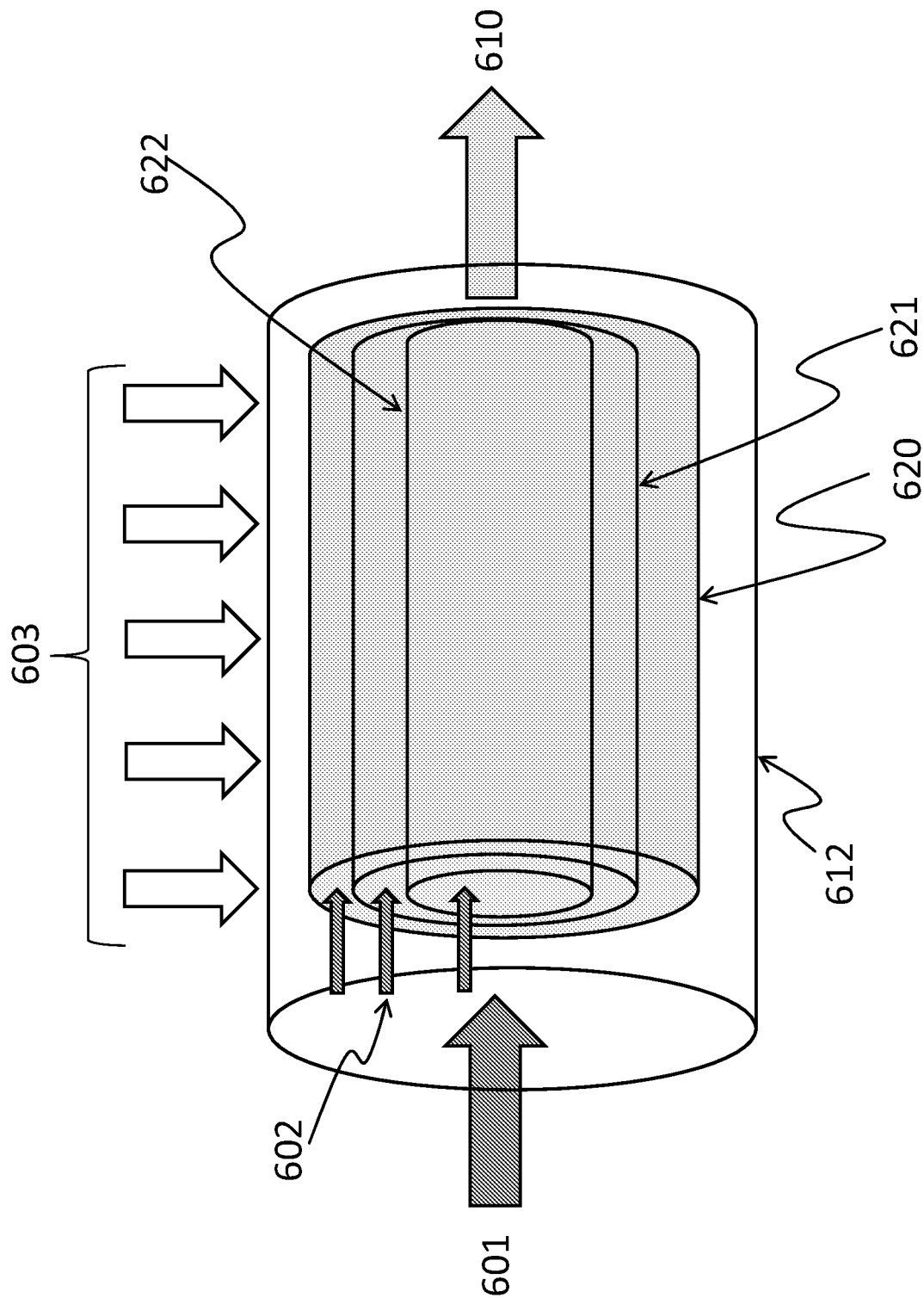
FIG. 6 is a schematic diagram of a process chamber containing a rare-earth metal or rare-earth metal compound in accordance with embodiments of the invention.

The combustion gas may be contacted with the rare-earth metal or rare-earth metal compound in a process chamber 612. As best seen in FIG. 6, the process chamber 612 may be constructed using a solid state rare-earth based composition formed in concentric cylindrical shapes 620, 621 & 622. Input flue gas 601 enters the capture process chamber 612 and is diverted 602 along the length of the cylinders. Energy 603 supplied (and/or extracted) to the process module is applied axially. The carbon is removed from the process and oxynitride products are expelled 610 from the chamber 612. The carbon that is captured in the chamber 612 can then be released via a stripping process, such as by water flushing. Alternatively, the rare-earth based capture process can be used until the rare-earth metal compound is saturated with carbon, wherein the chamber can be regenerated.

Figure 7A:
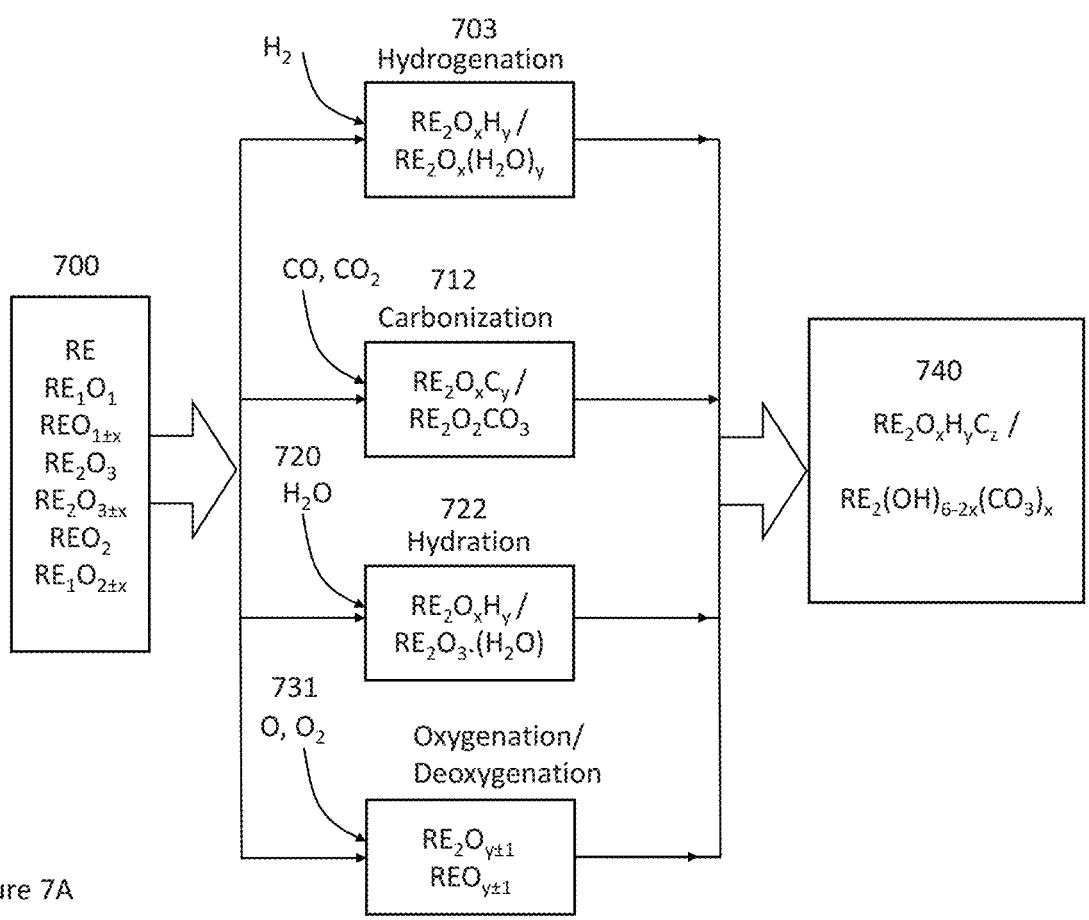
FIG. 7A is a schematic diagram showing an embodiment of a process wherein rare-earth oxides are used preferentially for hydrogenation, carbonization and hydration.
Figure 7B:
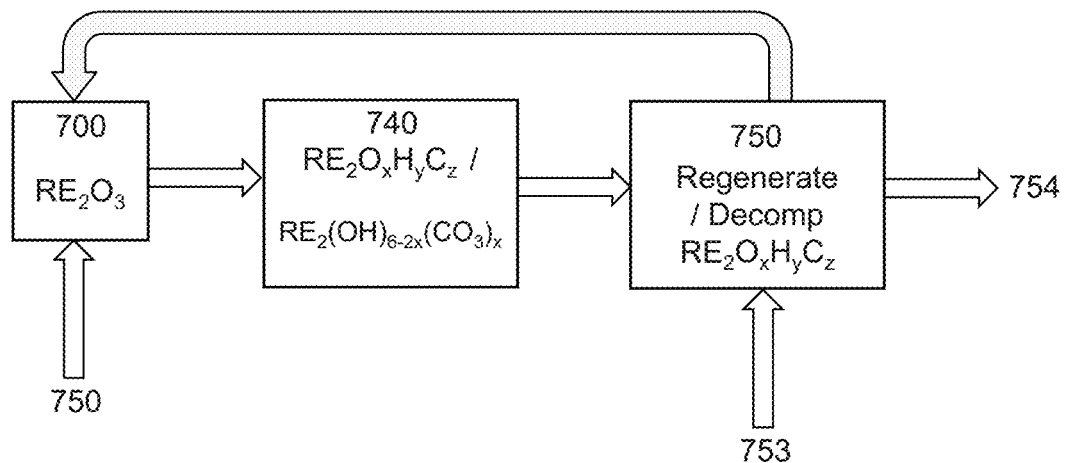
FIG. 7B is a schematic diagram showing an embodiment of a process for the regeneration of rare-earth based compounds containing oxygen and/or carbon and/or hydrogen.

Example processes are shown in FIGS. 7A & 7B wherein rare-earth oxides are used preferentially for hydrogenation 703, carbonization 712, and hydration 722.

The rare-earth based compounds produced containing oxygen and/or carbon and/or hydrogen 740, can be regenerated by the process shown in FIG. 7B. Input hydrocarbon can be reacted with various forms of rare-earth metal and rare-earth based compounds. For example, rare-earth metal or rare-earth oxides 700 can be reacted with hydrogen 703, carbon and/or oxides of carbon 712, water 720, oxygen 731 or chlorine (not shown). Oxygen and/or air can be reacted with rare-earth metal and/or oxygen deficient rare-earth-oxides to produce oxygenated forms of rare-earth oxides, such as sesquioxides $RE_2O_3$, dioxides $REO_2$ or mono-oxides REO. That is $RE_2O_{3-x}$ (0<x<3) indicates an oxygen deficient sesquioxide, $RE_2O_3$ a stoichiometric sesquioxide and $RE_2O_{3+x}$ (x>0) a supersaturated sesquioxide. It is also possible for a stoichiometric $RE_2O_3$ to exhibit crystal structure with oxygen defects or structural defects so as to enable oxygen to be captured and/or transported through the crystal. Under non equilibrium conditions such as high temperature, various forms of rare-earth based compounds can be functionalized to produce an affinity with a wide variety of elements, for example, O, N, P, C, H, Cl and combinations thereof. For example, $REH_3$ and $RECl_3$ exist as hydrogenated and chlorinated RE metal compounds. Hydrogen and/or carbon and/or oxides of carbon 750 are reacted with rare-earth sesquioxides ($RE_2O_3$, where RE=rare-earth metal and O=oxygen) 700 to form 740. FIG. 7B discloses a reversible reaction wherein input energy 753 applied to the reaction product 750 can be used to regenerate the RE-based compounds 700 and produce oxides of carbon and/or carbon containing product 754. Such a method is used advantageously for carbon capture and separation process.

Figure 7C:
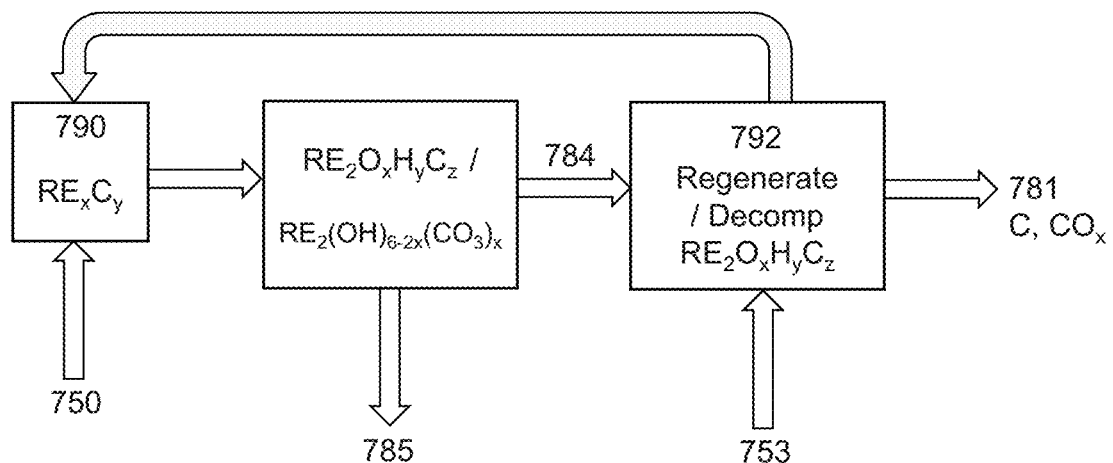
FIG. 7C is a schematic diagram showing an embodiment of a process for the separation of carbon-based compounds from an input mixture containing carbon oxides and non-carbon containing material. This process utilizes rare-earth carbides $(RE_xC_y)$, for example a carbon deficient rare-earth carbide compound, as the catalytic compound in the process.

A process such as the one shown in FIG. 7C may also be used for separation of carbon-based compounds from an input mixture containing carbon oxides and non-carbon containing material (e.g., nitrogen-oxide). This process utilizes rare-earth carbides ($RE_xC_y$), for example a carbon deficient rare-earth carbide compound 790, as the catalytic compound in the process. For example, post-combustion flue gas 750 reacted with $RE_xC_y$ 790 extracts preferentially oxides of carbon 784 from 750, while rejecting non-carbon containing gases 785. The carbon and/or carbon-oxide enriched catalyst 790 is then regenerated 755 and the oxides of carbon 754 separated to a subsequent process. Alternatively, an input methane stream 750 can be reacted with 790 to produce non-carbon containing combustible products 785 (such as hydrogen) and the carbon or carbon containing material 781 can then be separated.

Figure 8:
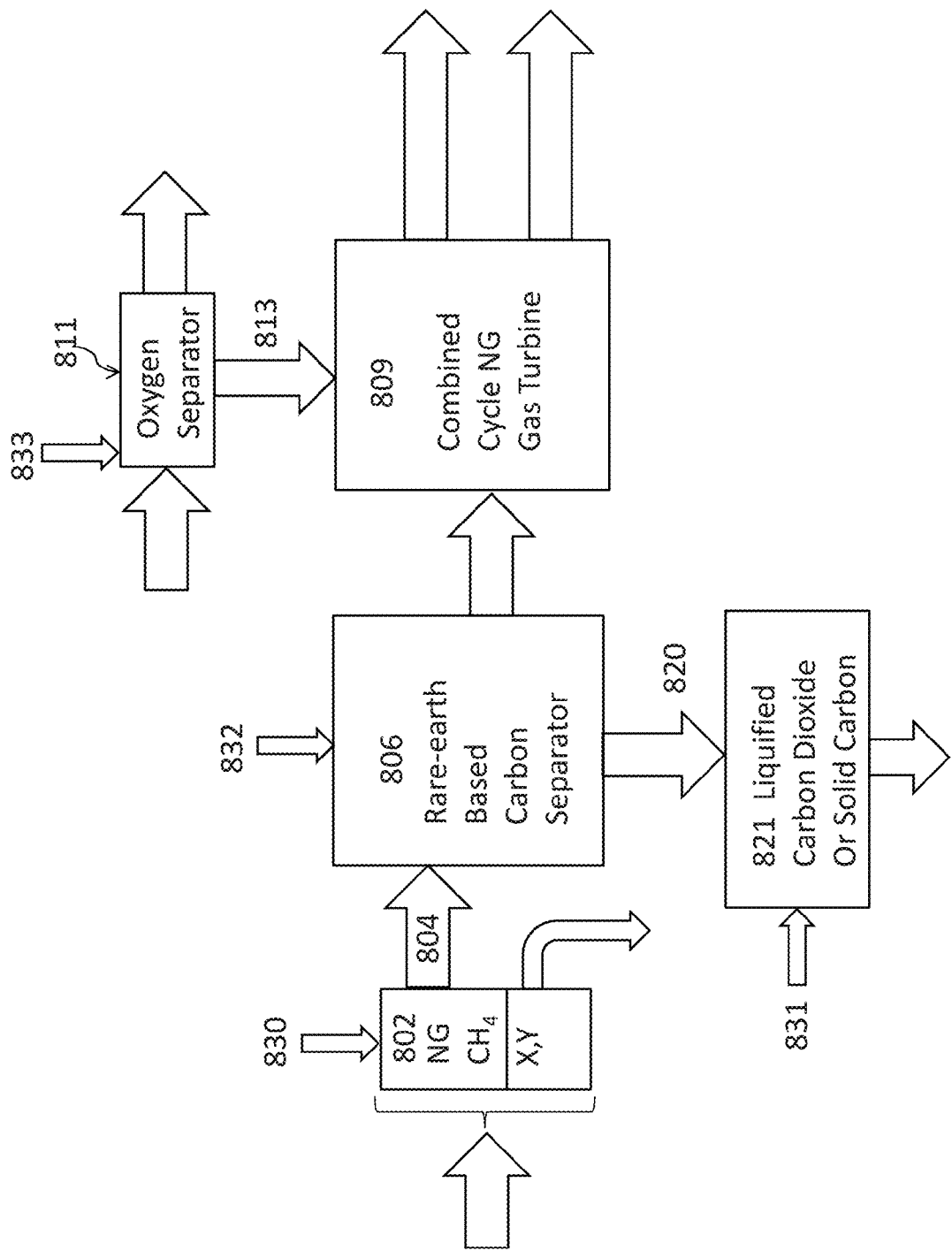
FIG. 8 is a schematic diagram showing an embodiment of a process for pre-combustion carbon capture utilizing rare-earth based compounds.

A further embodiment is shown in FIG. 8, wherein a pre-combustion carbon capture process is used. NG is extracted from a gas field 801 and purified into a majority of methane 804. The methane 804 is reacted in a carbon separation process 806 utilizing rare-earth based compounds. Energy is supplied to process 806 and can be optionally derived from solar thermal and/or a renewable energy source to reduce the energy penalty in the power conversion cycle. The carbon separation process provides for the reaction of methane with the rare-earth based compound so as to produce hydrogen gas and carbon and/or carbon oxides and/or rare-earth carbon oxides and hydrated rare-earth carbides. The hydrogen content can be in the form of $H_2$ or rare-earth hydride. The carbon-free hydrogen and/or hydride 806 is then used for direct combustion in a CCG turbine system 809. Oxygen 813 separated from air is optionally used for burning the NG derived hydrogen feedstock. The waste products from the CCG cycle 809 are potentially water vapor and/or nitrogen oxides. Alternately, a hydrogen oxygen fuel cell can be used in process 809.

Energy inputs 830, 831, 832 & 833 are supplied for processes 802, 821, 806 & 811, respectively. The energy is either diverted from the utility power generated and/or provided by renewable energy sources.

The pre-combustion stripped carbon 820 can be in the form of elemental carbon and/or carbon oxide. For the case of carbon oxide gas, liquification can be performed for geological sequestration.

Figure 9:
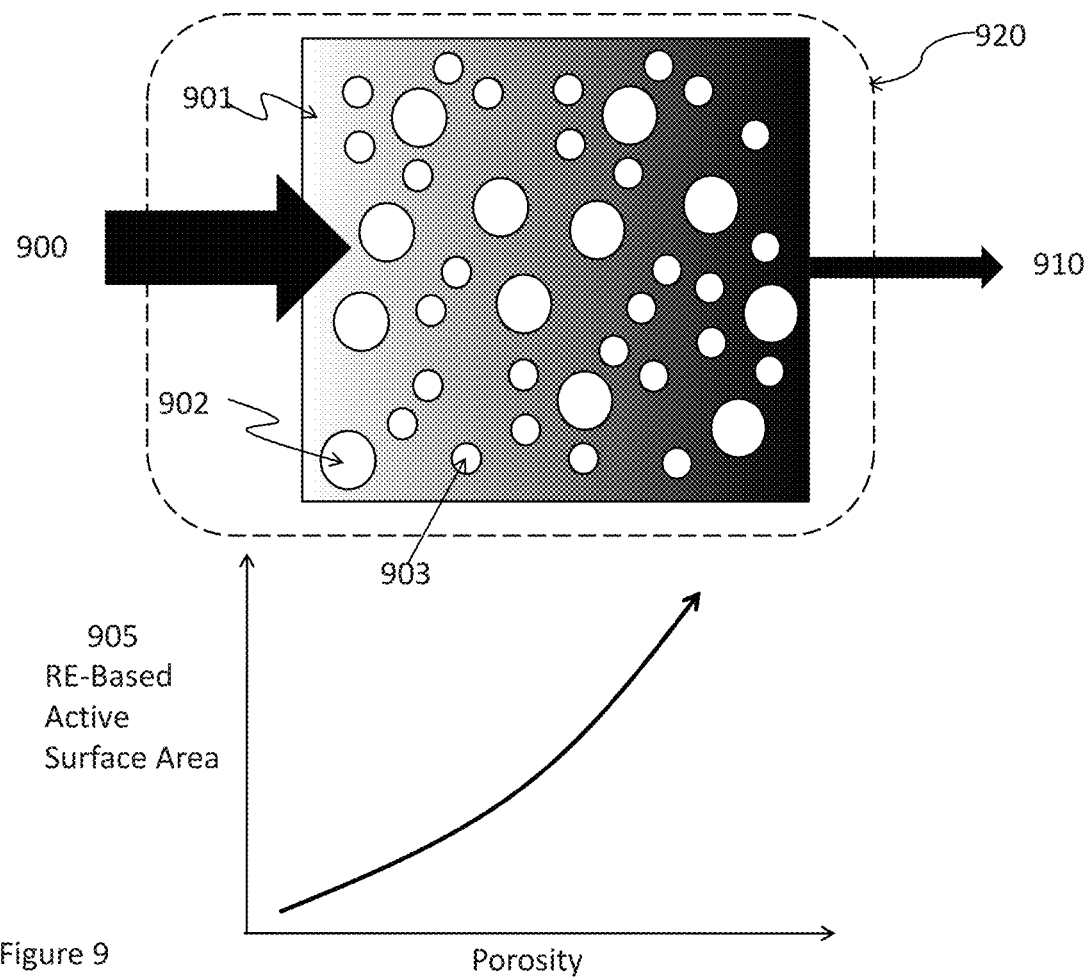
FIG. 9 is a schematic diagram showing an embodiment of a rare-earth based adsorption process. In this embodiment, the rare-earth based compound is formed into a porous structure so to increase the surface area available for capture of carbon oxide and/or hydrocarbon.

An example rare-earth based adsorption process is shown in FIG. 9. The rare-earth based compound is formed into a highly porous structure so to increase the surface area available for capture of carbon oxide and/or hydrocarbon. The input carbon oxide containing feedstock 900 enters a carbon capture process chamber 920. A porous membrane and/or volume comprising rare-earth based sorption material 901 is located in the direct path of feedstock flue gas 900. The carbon monoxide and/or carbon dioxide is selectively removed from the input gas and converted into rare-earth based carbide, rare-earth carbide, rare-earth oxy carbide or other compound containing a majority of rare-earth metal and carbon and/or oxygen. The porosity of the membrane 901 is characterized by the size and density of holes 902 and 903 punctuating the rare-earth based member 901. The active surface area 905 is a strong function of the porosity of the member 901 and determines the pressure differential across the process chamber 920. The carbon removed from the input flue gas 900 is either reacted with the rare-earth based compound and physically confined in the pores of the membrane 901. The volume of carbon oxide that can be removed from the input flue stream depends on the carbon saturation density and is related to the total surface area 905 of the membrane and/or member 901. For a carbon capture process chamber 920 operating below the carbon saturation density, the exit gas stream 910 is substantially free of carbon containing species. Once the carbon saturation density is reached, the feedstock 900 is removed and the carbon can be expelled via a regeneration process. The regeneration process may require the addition of thermal energy and reactants such as steam. For substantially rare-earth carbide material, the property of super ionic conduction is possible.

Rare-earth carbides formed in the carbon capture process may have utility themselves and may be used as a starting material in further processes. For example, fuel cells that consume carbon have the advantages of high temperature operation, increased conversion efficiency, and reduced pollution in power generation from carbon-based fuel sources. Carbon-ion superionic membrane material, such as rare-earth carbides, enable a new class of carbon fuel cells consuming carbon directly as the fuel source. Superionic membrane materials for carbon ions are candidate materials for direct carbon fuel cells (DCFCs). Therefore, the rare-earth carbide membrane 901 formed via capture of carbon oxides can regenerate the carbon oxide via application of direct current input energy, thereby operating a DCFC in reverse. The electrical energy can be provided via large scale photovoltaic power generation.

Carbon-ion superionic conductors allow the direct conversion of carbon to electricity and pure carbon dioxide without the formation of gaseous pollutants. The process is reversible and can be used for the capture of carbon dioxide. The $REC_x$'s and compounds disclosed herein exhibit high carbon-bond ionicity, stoichiometric and non stoichiometric carbon atomic compositions. Superionic carbide-ion conductors, carbon-vacancy and carbon interstitial (i.e., super-saturated carbon) structures enable the artificial engineering of new functional materials. Superionic properties can be engineered in the present invention via the use of binary, pseudo-binary and/or ternary RE-based carbides, such as compounds of the form $REC_xO_yN_zP_uH_nCl_m$. Furthermore, $REC_x$ can also be doped with at least one of O, N, P, H and/or Cl to generate vacancies on the carbon-ion sublattice and thereby increase carbon-ion diffusion rates.

The rare-earth carbide structure determines both ionic and electronic conductivity. Generally, ionic conduction occurs at higher temperatures via propagation through crystal defects. The distinguishing feature of superionic conductors is the property of high ionic conductivity even at temperatures well below their melting point.

A figure of merit for efficiency in carbon-ion fuel cells is the carbon diffusion rate $(Dc(t))$ in $REC_x$ and associated compounds at high temperatures. The present invention teaches Dc(t) can be tailored by the use of crystal structures exhibiting stoichiometric compositions, carbon-vacancies, and/or carbon rich/RE-deficient compositions.

Another figure of merit for optimal ionic conduction is a structure exhibiting crystal channels conducive for transport of mobile ions. Open ion-conduction channels may be generated in close packed structures by interstitial and/or vacancy sites.

Figure 10:
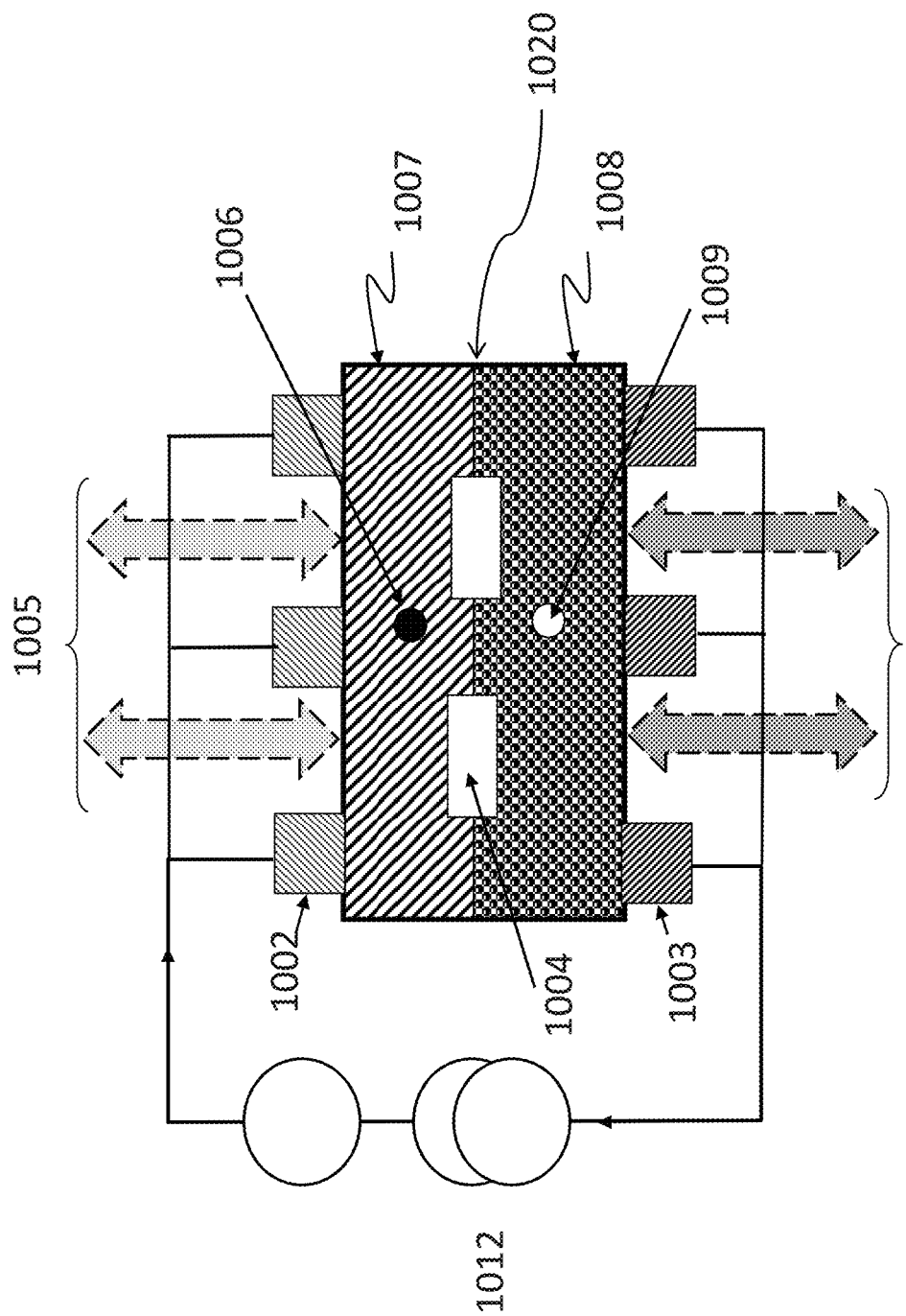
FIG. 10 is a schematic diagram showing an embodiment of a carbon-ion and oxygen-ion layered structure fuel cell using $REC_x$ superionic materials.

FIG. 10 discloses a carbon-ion and oxygen-ion layered structure fuel cell using $REC_x$ superionic materials. The composite layer structure consisting of carbon-ion superionic layer 1007 and oxygen-ion superionic layer 1008, forming an interface 1020. The electrical contacts 1002 and 1003 provide electrical contacts to the superionic layers and form an external circuit allowing external current to flow or an external current 1012 to be injected. Incident carbon containing species 1006 and oxygen containing species 1009 are incident upon the surfaces formed by the exposed layers 1007 and 1008, respectively, forming a reactor channel 1004. Diffusing carbon and oxygen ions interact at the interface 1020, thereby providing advantageous reaction for energy conversion process.

Figure 11:
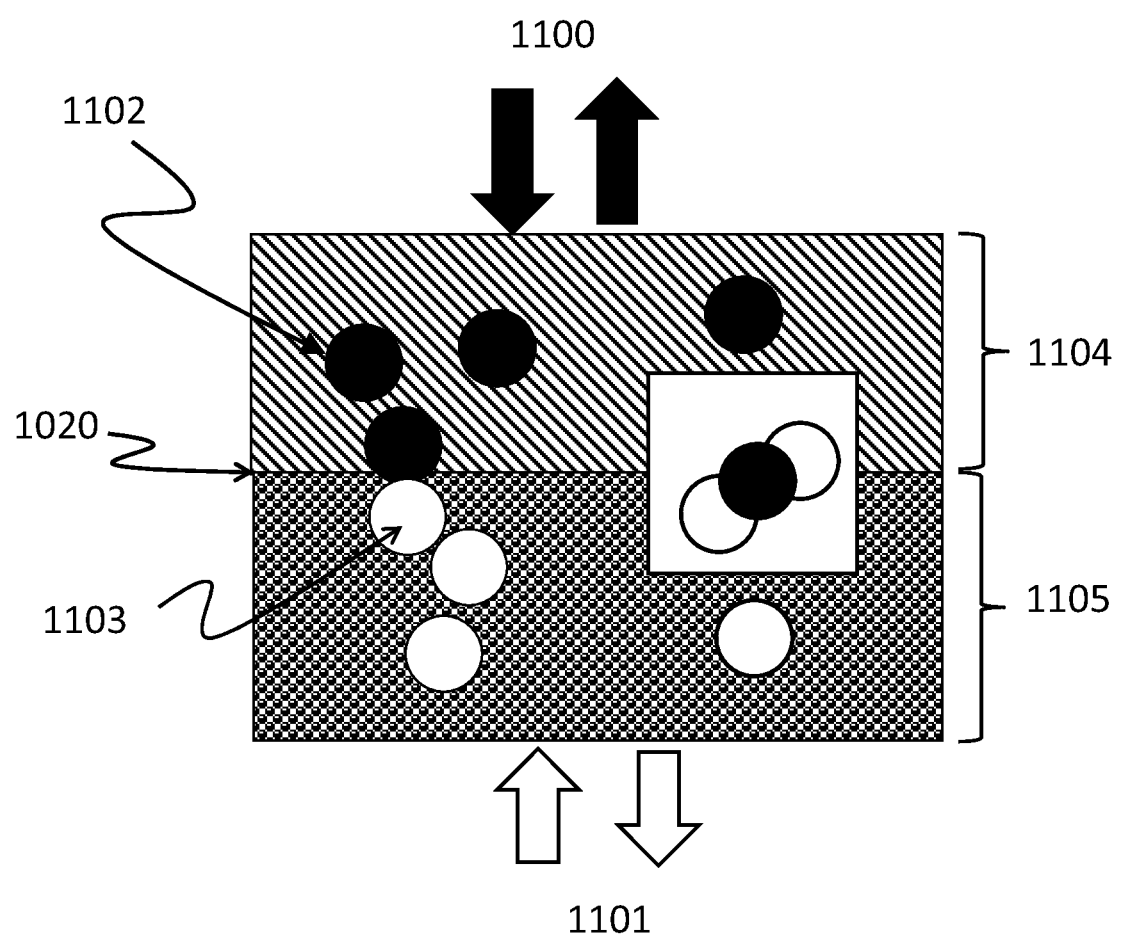
FIG. 11 is a schematic diagram showing an embodiment of a carbon-ion and oxygen-ion layered structure fuel cell using $REC_x$ superionic materials.
Figure 12:
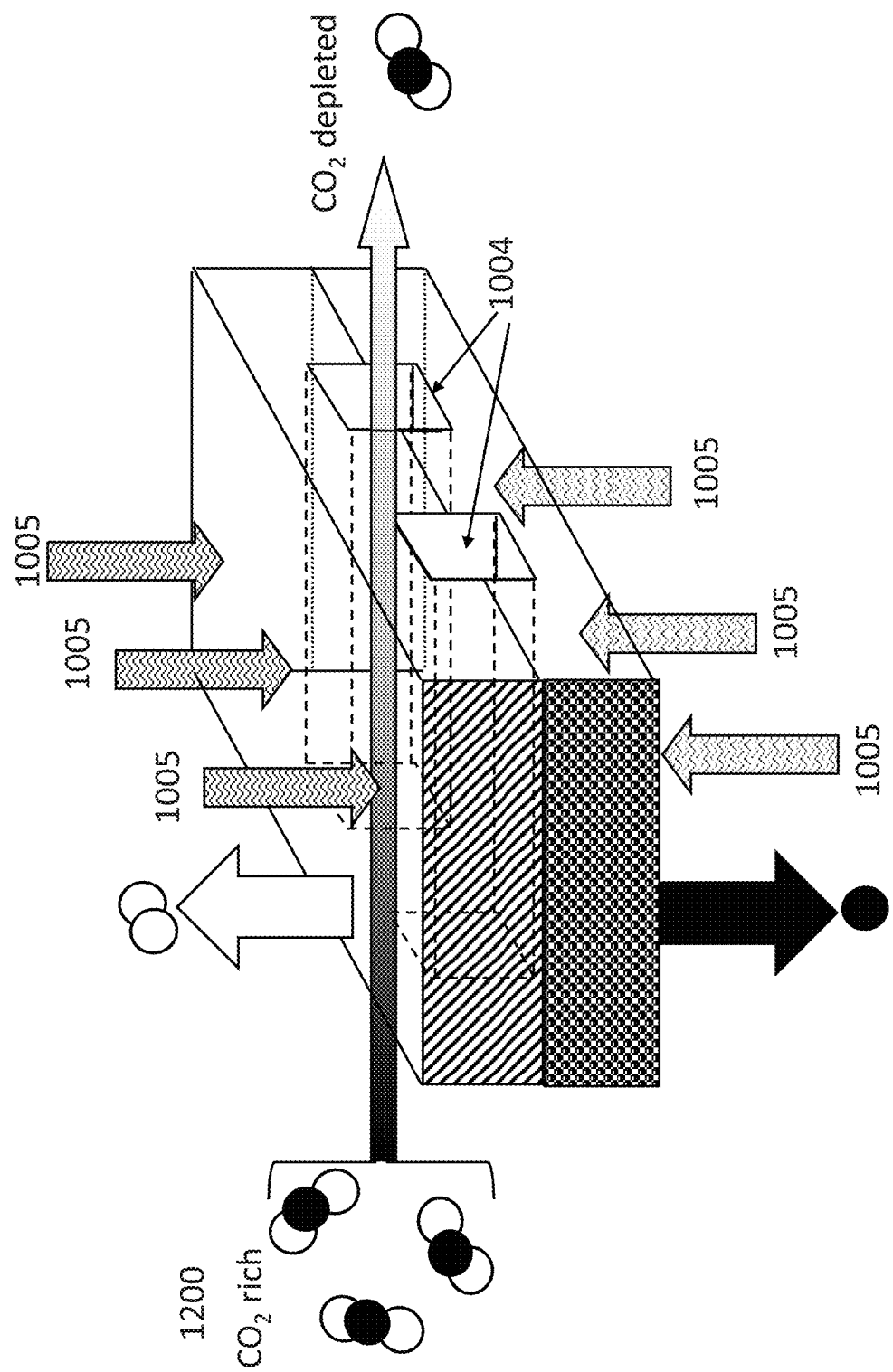
FIG. 12 is a schematic diagram showing an embodiment of a carbon-ion and oxygen-ion layered structure fuel cell using $REC_x$ superionic materials.

FIGS. 10, 11 & 12 further disclose carbon-ion 1007 and oxygen-ion 1008 materials forming direct energy conversion fuel cell providing gas transport channel at the interface 1020. Externally applied heat 1005 is used to enhance the decomposition of gas species such as $CO_2 \rightarrow_{heat} C+2O$ which is depleted along the length of the channel 1004. An electrical current is induced in external circuit 1012 via electrodes 1002 & 1003 forming contacts to superionic materials 1007 and 1008, respectively.

Alternatively, a direct current and/or voltage can be applied to the terminals of the carbon capture cell with air and/or oxygen supplied to the device. The superionic conduction of carbon ions 1100 and oxygen ions 1101 in a substantially rare-earth carbide layer 1104 and superanion conductor 1105, such as, zirconia and/or zircon. The reaction of carbon ion and oxygen ion and/or nitrogen ions forms carbon oxide and oxynitride gas. The regenerated carbon is thus produced by initially selective capture from an input carbon oxide stream and stored as a rare-earth based carbide. FIGS. 11 and 12 further show possible mechanisms for device operation. For the case of input carbon dioxide molecules 1200 introduced into the channel 1004, reaction at suitable pressure, temperature and/or applied electric power, the carbon dioxide molecules dissociate liberating preferentially carbon atoms 1102 into the rare-earth carbide layer and oxygen atoms 1103 in the zirconia and/or anion conducting layer. The carbon propagates through the rare-earth carbide layer until it reaches an exposed surface and is removed as substantially carbon. Likewise, the oxygen is liberated at the opposing layer surface.

A key feature of the carbon cracker and/or former is the functionalisation of the interface 1020 enabling the surface reactions and/or processes to occur and separation of the by-products, as shown in FIGS. 10 to 12.

Rare-earth metal oxide and/or rare-earth based compounds produced in the carbon capture process may also be used in combustion processes. Rare-earth metal-oxygen transfer (REMOT) combustion separates the processes of combustion of a hydrocarbon or carbonaceous fuel into separate oxidation (OX) and reduction (RED) reactions by introducing a suitable rare-earth metal oxide and/or rare-earth based compound as a preferential oxygen carrier to circulate between the two OX and RED reactors.

Separation of oxygen from air is accomplished by fixing the carrier and/or excess oxygen as a metal oxide. Potentially, no air separation plant is required. The reaction between fuel and oxygen is accomplished in a second reactor by the release of oxygen from the rare-earth based compound and/or rare-earth metal oxide in a reducing atmosphere caused by the presence of a hydrocarbon or carbonaceous fuel. Factors controlling the process are: (i) the recycle rate of the solid material between the two reactors; (ii) the average solids residence time in each reactor; (iii) control of the heat balance and/or the temperature levels in each reactor; and (iv) stability of the rare-earth based compound. The effect of having combustion in two reactors compared to conventional combustion in a single stage is that the carbon dioxide is not diluted with nitrogen gas, but is almost pure after separation from water. This process may not require any extra energy demand/or costly external equipment for carbon dioxide separation.

Figure 13:
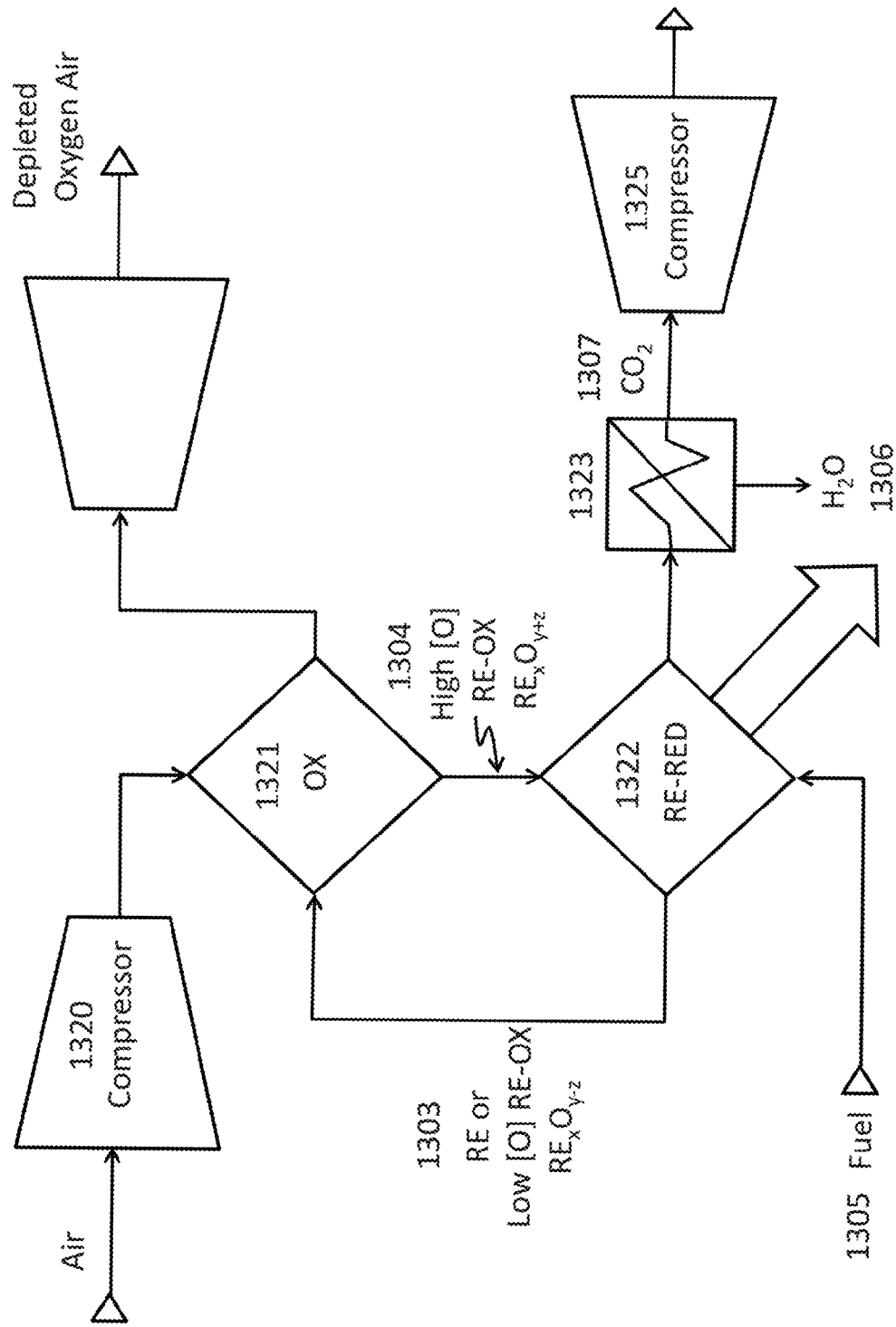
FIG. 13 is a schematic diagram showing an embodiment of a general process for the OX-RED process utilizing rare-earth metal oxide and/or rare-earth based compounds.

The general process for the OX-RED process utilizing rare-earth metal oxide and/or rare-earth based compounds is disclosed in FIG. 13. The rare-earth based OX reactor 1321 oxygenates rare-earth oxide and/or rare-earth based particles and comprising oxygen vacancy and/or preferentially combining with oxygen via high affinity reaction. Air and/or oxygen is preferably but not limited to, compressed 1320 and injected into the OX reactor 1321. The oxygen containing particles are transported to the RED reactor 1322 for reaction with hydrocarbon fuel 1305. In preference, the fuel 1305 is comprised substantially of methane and/or Syngas. The RED reactor products 1323 are exothermic reaction and/or carbon-free converted fuel (such as hydrogen) and is used to power a gas and/or steam turbine for power generation.

The oxygen consumed in the RED reactor 1322 is via the initial charge of oxygen containing material 1304 and is regenerated as oxygen deficient rare-earth oxide or rare-earth based compound or rare-earth metal 1303. The oxygen depleted charge 1303 is recycled and transported to be oxygenated in the OX reactor 1321. The by-products from the RED reactor substantially comprise oxides of carbon and water and are separated by condensation in process module 1323 wherein the carbon containing products 1307 are separated from the water 1306. The high concentration of carbon dioxide 1307 is compressed 1325 in liquid form as supercritical fluid and transported for either sequestration and/or conversion into stable product.

Rare-earth metal oxides in combination with transition-state metals, such as iron (Fe), nickel (Ni), copper (Cu) and manganese (Mg) can also be utilized advantageously. Yet a further compound that can be utilized for metal oxide suitable for the present invention is zinc oxide (ZnO) and rare-earth containing zinc-oxides. Aluminium and/or titanium metals and/or oxides may also be utilized.

The metal/metal oxide may be present in various structure and/or sizes. Generally, particles with diameter 10 μm-1 mm are preferred. In order to move particles between the two OX and RED reactors, the particles may be fluidized and thus transported efficiently. The method of fluidization ensures efficient heat and mass-transfer between the input mixing gases and the active particles. A critical issue is the long-term mechanical and chemical stability of the particles that have to undergo repeated cycles of oxidation and reduction, to minimize the make-up requirement. In preference, the REMOT cycle may be used in a gas turbine cycle. The temperature in the reactors is preferentially in the range 500° C.-1300° C. The heavy rare-earth metals forming oxides (comprising RE chosen from at least one of Dy to Lu) are known to have crystal structures that are stable from room temperature to in excess of 2000° C. Conversely, the lighter RE's forming oxides are known to exhibit significant structural phase change in a similar temperature range. The oxygen vacancy concentration and/or oxygen excess carrying capacity of rare-earth oxides are therefore controlled in part by the types of rare-earth metals chosen for the REMOT process.

Furthermore, nitrous oxide and/or oxy-nitrides formation at these high operating temperatures will generally be low and thus advantageous for control of the carbon-free emission species and concentration. The fuel conversion in the reduction reactor may also not be complete such that small concentrations of methane and CO remain when burning natural gas. To avoid deposit of carbon and/or carbon-based solids in the reduction reactor, it may be necessary to utilize steam together with the fuel.

The REMOT cycle (as shown by way of an example in FIG. 13) may be applied either in a gas turbine cycle with pressurized oxidation and reduction reactors, or in a steam turbine cycle with atmospheric pressure in the reactors. In the case of a gas turbine cycle, the oxidation reactor replaces the combustion chamber of a conventional gas turbine. The exothermic oxidation reaction provides heat for increasing the air temperature entering the downstream expansion turbine. In addition, the reduction reactor exit stream may also be expanded in a turbine together with steam production for power generation. The cooled low pressure carbon dioxide stream will then be compressed to pipeline pressure. Another option is to generate steam using heat transfer surfaces in the oxidation reactor. It is known in conventional fluidized bed combustion technology, that operating at atmospheric pressure in both the oxidation and reduction stages necessitates the use of a steam turbine cycle for power generation.

Low or high purity rare-earth metal and rare-earth based compounds can be used in the processes of the present invention. For any industrial process, it is generally more economical to use the lowest cost materials possible. Thus the purity of a rare-earth metal or combination of different rare-earth metals required for a particular process may be important. The typical purity of specific atomic number rare-earth metal relative to other rare-earths is typically difficult to obtain beyond 3N purity. The chemical reactivity and stability of rare-earths are determined in major part by the ionization states possible and the atomic mass. That is, the heavier rare-earth metals form compounds that are typically more stable structurally at high temperature relative to the lighter rare-earths.

Ionic conductors that can be used as REMOT materials include rare-earth doped cerium oxide, rare-earth doped zirconium oxide and rare-earth sesquioxides all exhibiting cubic fluorite structure or bixbyite crystal structure. The electrical properties of RE-doped fluorite and/or RE-oxide bixbyite can be significantly influenced by the dopant type. Generally, as the dopant radius deviates from an optimum value in the oxide, the ionic conductivity of the doped RE-oxide decreases dramatically. This phenomenon is believed to be attributable to the dopant-oxygen vacancy association which depends on the dopant radius and valance type (see FIG. 2A). For the case of dilute doping range, the ionic conduction is dominated by this effect and exhibits a maximum conductivity. For example RE-doping with a species with propensity for high valency (e.g. $RE^{3+}$) into a cubic fluorite RE-oxide, such as cerium oxide ($CeO_2$) will exhibit this effect. For the case of heavily doped cubic fluorite, there may exist nanosized domains that may form, negatively altering the conductivity as traps.

Finally, it will be appreciated that various modifications and variations of the methods and compositions of the invention described herein will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are apparent to those skilled in the art are intended to be within the scope of the present invention.

Also, it must be noted that, as used herein, the singular forms "a", "an" and "the" include plural aspects unless the context already dictates otherwise.

Throughout this specification, unless the context requires otherwise, the word "comprise", or variations such as "comprises" or "comprising", will be understood to imply the inclusion of a stated element or integer or group of elements or integers but not the exclusion of any other element or integer or group of elements or integers.

The claims defining the invention are as follows:

1. A process for capturing a carbon-containing compound from a gas, the process comprising
    contacting the gas with a rare-earth metal (RE) compound in substantially crystalline form for a time and under conditions suitable to capture at least some of the carbon-containing compound from the gas by chemically binding the carbon-containing compound to the crystalline structure of the rare-earth metal compound to produce a treated gas, wherein the rare-earth metal compound is selected from at least one of a:
    a) rare earth metal carbide having the chemical formula $RE_xC_y$;
    b) rare earth metal carbide compound having the chemical formula $REC_xM_y$, where M is any one of oxygen (O), nitrogen (N), phosphorous (P), chlorine (Cl) or hydrogen (H); or
    c) rare earth metal carbide compound having the chemical formula $REC_xO_yN_zP_uH_nCL_m$; and then
    separating the treated gas from the rare-earth metal compound comprising the captured carbon-containing compound.

2. The process of claim 1 wherein the gas comprises a combustion gas.

3. The process of claim 1 wherein the gas comprises a carbon containing fossil fuel.

4. The process of claim 1, wherein the gas comprises a fuel and the process is used to remove a carbon-containing compound in a pre-combustion carbon capture process.

5. The process of claim 1, wherein the gas comprises waste from a combustion process and the process is used to remove a carbon-containing compound in a post-combustion carbon capture process.

6. The process of claim 4, wherein the combustion comprises combustion of a fossil fuel.

7. The process of claim 1, wherein the carbon-containing compound comprises a carbon oxide.

8. The process of claim 1, wherein the carbon-containing compound comprises carbon dioxide and/or carbon monoxide.

9. The process of claim 1, wherein the crystalline form of the rare-earth metal carbide is a cubic crystal structure.

10. The process of claim 9, where the cubic crystal structure is any one of a:
   a) rare-earth metal monocarbide having the chemical formula $RE_xC_x$;
   b) rare-earth metal dicarbide having the chemical formula $RE_xC_{2x}$;
   c) rare-earth metal sesquicarbide having the chemical formula $RE_2C_3$; or
   d) non-stoichiometric rare-earth carbide.

11. The process of claim 1, wherein the separating of the treated gas from the rare-earth metal compound comprising the captured carbon-containing compound comprises removing the carbon-containing compound by contacting the rare-earth metal compound comprising the captured carbon containing compound with a thermal source.

12. The process of claim 1, wherein the separating of the treated gas from the rare-earth metal compound comprising the captured carbon-containing compound comprises removing the carbon-containing compound by contacting the rare-earth metal compound comprising the captured carbon-containing compound with an oxidizing gas.

13. The process of claim 1, wherein the separating of the treated gas from the rare-earth metal compound comprising the captured carbon-containing compound comprises removing the carbon-containing compound by contacting the rare-earth metal compound comprising the captured carbon-containing compound with an electrical power source.

* * * * *

UNITED STATES PATENT AND TRADEMARK OFFICE
CERTIFICATE OF CORRECTION

PATENT NO. : 9,101,876 B2  Page 1 of 1
APPLICATION NO. : 13/202183
DATED : August 11, 2015
INVENTOR(S) : Petar Branko Atanackovic et al.

It is certified that error appears in the above-identified patent and that said Letters Patent is hereby corrected as shown below:

In the Claims

In col. 14, claim 1, line 46, the phrase "rare earth" should be replaced with --rare-earth--.

In col. 14, claim 1, line 48, the phrase "rare earth" should be replaced with --rare-earth--.

In col. 14, claim 1, line 52, the phrase "rare earth" should be replaced with --rare-earth--.

In col. 14, claim 1, line 53, the phrase "$REC_xO_yN_zP_uH_nCL_m$;" should be replaced with --$REC_xO_yN_zP_uH_nCl_m$;--.

Signed and Sealed this
Ninth Day of February, 2016

Michelle K. Lee
*Director of the United States Patent and Trademark Office*